Jan. 10, 1961 A. STRICKLER 2,967,749
INTEGRATING METHOD AND APPARATUS
Filed Feb. 24, 1958 2 Sheets-Sheet 1

INVENTOR.
ALLEN STRICKLER
BY HIS ATTORNEYS.
HARRIS, KIECH, FOSTER & HARRIS

Jan. 10, 1961 A. STRICKLER 2,967,749
INTEGRATING METHOD AND APPARATUS
Filed Feb. 24, 1958 2 Sheets-Sheet 2

INVENTOR.
ALLEN STRICKLER

BY HIS ATTORNEYS.
HARRIS, KIECH, FOSTER & HARRIS

United States Patent Office 2,967,749
Patented Jan. 10, 1961

2,967,749

INTEGRATING METHOD AND APPARATUS

Allen Strickler, Fullerton, Calif., assignor to Beckman Instruments, Inc., a corporation of California Filed Feb. 24, 1958, Ser. No. 717,236

13 Claims. (Cl. 346—33)

This invention relates to an integrating method and to apparatus for performing the method. More particularly, it relates to a method of recording information to provide a direct record of the integral of the information and is a substitute for and improvement on planimeters, known recording integrators and the like.

It is an object of the invention to provide method and apparatus for recording a dependent variable wherein the integral of the dependent variable appears as a linearly measurable quantity.

In certain types of analysis and physical testing the output signal or dependent variable ordinarily is recorded as a function of an independent variable, such as real time, producing a curve wherein the desired quantitative information is the area under the curve or a selected portion thereof such as a peak in the curve, i.e. wherein the integral of the output signal is desired. This type of recording is typical of gas chromatography and it is an object of the invention to provide a method and apparatus for recording the output of a gas chromatograph which gives a direct measure of the area under the peaks of the output of the chromatograph. The method and apparatus of the invention have many analogous applications and can be used to record totalized flow in the process industries, to record the integrated energy required to rupture a specimen in a tensile testing machine, or to record the integral of an absorption band in absorption spectroscopy for deriving the value of an extinction coefficient.

It is an object of the invention to provide method and apparatus which gives sharp and definite indication of integration limits in chromatograms and like curves, thereby making record interpretation easy and accurate and minimizing problems due to tailing of the output peaks. Another object of the invention is to permit more precise extrapolation of incompletely resolved peaks of a chromatogram or similar curve to determine more accurately the integration limits of such peaks.

The invention contemplates the use of a conventional recording chart and pen or other marking device wherein the marking pen is driven as a function of the output signal and the chart is driven at a rate proportional to the output signal with respect to an independent variable which is usually but not necessarily real time. In such a structure, the pen and chart will be moved relative to each other along one co-ordinate axis as a function of the output signal or dependent variable and along a second co-ordinate axis in proportion to the integral of the output signal. Another object of the invention is to provide such method and apparatus which can be used with charts having rectangular, circular, or other systems of co-ordinates.

The invention also comprises novel details of construction and novel combinations and arrangements of parts, which will more fully appear in the course of the following description. The drawings merely show and the description merely describes preferred embodiments of the present invention which are given by way of illustration or example.

Figure 1:
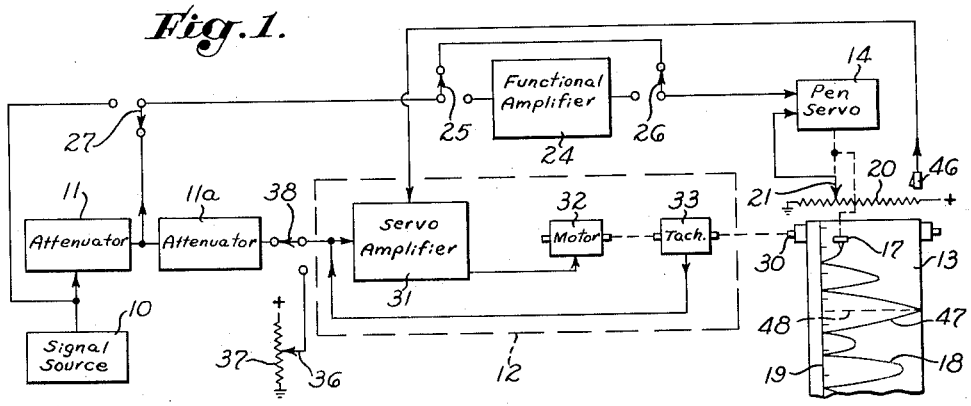
Fig. 1 is a diagrammatic representation of a preferred embodiment of the invention using real time as the independent variable.

The equipment of Fig. 1 includes a signal source 10, a signal attenuator 11, another signal attenuator 11a, a rate servo 12, a chart 13 and a pen servo 14. The signal source 10 produces the output signal or dependent variable which is to be handled by the recording equipment. The output signal is directed through the attenuator 11 to the pen servo 14 and to the rate servo 12. The attenuator 11 provides for adjusting the signal level if need be, to maintain peak values always on scale. The attenuator 11a, as hereinafter explained, is often useful in gas chromatography and similar applications where there may be a wide range in peak duration times. The pen servo 14, which may be conventional in design, mechanically drives a marking pen 17 to produce a record curve 18 on the chart 13, the pen being moved to the right from a base line 19, which represents the zero signal value, as a function of the signal coupled to the pen servo. A feedback circuit is provided for the pen servo comprising a potentiometer 20 coupled across a D.C. source with an arm 21 mechanically coupled to the pen 17 and electrically connected to the pen servo input.

The movement of the pen 17 ordinarily is directly proportional to the input signal to the pen servo, although other relationships may be provided if desired. When it is desired to have the pen motion be some other function of the dependent variable from the signal source 10, such as a logarithmic or square root function, it is preferred to insert a functional amplifier 24 in series with the signal to the pen servo which amplifier provides an output which is the logarithm or other desired function of its input. The amplifier may be permanently connected in the circuit or may be switched into the circuit by simultaneous actuation of switches 25, 26, as shown in Fig. 1. A switch 27 provides for bypassing the attenuator 11 when desired.

The rate servo 12, which may be conventional in design, drives a shaft 30 at a velocity proportional to the input signal to the servo. The servo includes an amplifier 31, which energizes a motor 32, the motor in turn driving a tachometer generator 33 as well as the shaft 30, the generator 33 providing a negative feedback signal for the amplifier 31. The shaft 30 driving the chart 13, is coupled to the tachometer generator either directly or through reduction gearing. The velocity of chart movement is equal to a constant times the input signal to the rate servo. If we designate the linear displacement of the chart by $x$, then $dx/dt = ke$, where $dx/dt$ is the derivative of $x$ with respect to time, $e$ is the magnitude of the input signal and $k$ is a constant. Then $x = k\int e\, dt$, i.e., the linear distance along the base line 19 marked off by the beginning and end of one of the peaks recorded on the chart is proportional to the time integral of the output signal from the signal source or, stated differently, this linear distance is proportional to the area of the curve obtained by plotting the output signal versus time.

Figure 2:
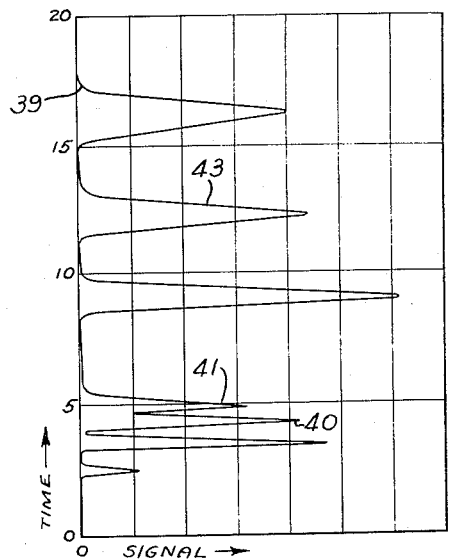
Fig. 2 shows a typical chart of the output of a conventional gas chromatograph.
Figure 3:
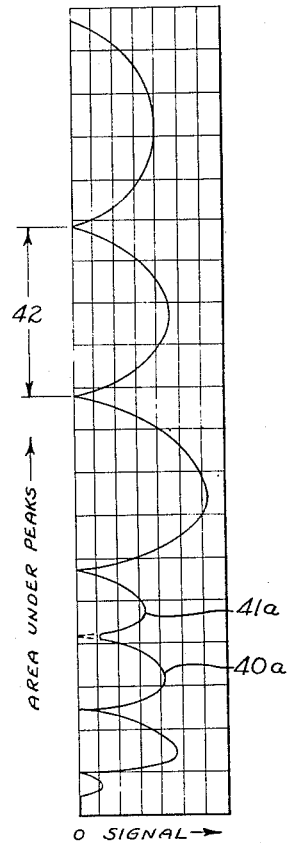
Fig. 3 shows a chart corresponding to that of Fig. 2 and made according to the teachings of the invention.

Fig. 2 shows a conventional output record of a gas chromatograph and Fig. 3 shows the corresponding record produced by the apparatus of Fig. 1. The curve of Fig.

2 may be made by the apparatus of Fig. 1 whenever desired by supplying a constant input signal to the rate servo 12. This may be done by switching the input of the servoamplifier to an arm 36 of a potentiometer 37 by means of a switch 38, the potentiometer being coupled across a D.C. source to provide a constant input signal. When the arm 36 is connected as the input to the servo, the chart 13 will be driven at a constant velocity with respect to time and the diagram of Fig. 2 will be produced where each peak represents the separate component of the mixture being analyzed in the gas chromatograph and the area under each peak represents the relative proportions of the various components in the mixture. Determining the areas from this diagram is a relatively indirect process, also it is time-consuming and difficult to perform always with the desired accuracy.

The tailing of the curve, such as indicated by the arrow 39, also makes accurate totaling of the area under the curve difficult since the area or integration limits are not clearly defined. Further, when there is appreciable overlapping of peaks, such as the incompletely resolved peaks 40, 41, determining the area limits becomes pure guesswork and accurate integration is no longer possible. Nevertheless, it may sometimes be desirable, for comparison with conventional records or as one means of determining the time when given peaks appeared in the record, to run curves of the type of Fig. 2 on the apparatus of Fig. 1 or that of Fig. 5, described below.

With the switch 38 in the position indicated in Fig. 1, the form of record shown in Fig. 3 is produced assuming the output signal from signal source 10 as a function of time is that shown in Fig. 2. Each peak in Fig. 3 represents the same element of the mixture as the corresponding peak in Fig. 2; however the linear distance in the direction of movement of the chart between zeroes of the curve represents and is proportional to the area under the corresponding peak in Fig. 2. For example, the distance 42 of Fig. 3 is proportional to the area under the curve 43 of Fig. 2. With the chart of Fig. 3, the uncertainties of area limits due to tailing are substantially eliminated since the curves are found characteristically to approach the zero value at a sharply defined point. Moreover when overlapping or incompletely resolved peaks occur such as peaks 40, 41 of Fig. 2, relatively accurate measurements can still be made since the curves can be extrapolated with higher reliability to a definite zero value as shown by the dotted extensions of curves 40a and 41a. Inherently, the extrapolations of two such adjoining peaks meet at a common point on the zero axis of the chart. They do not cross, as do the extrapolations of unresolved peaks on the conventional chromatogram, hence by supplementing each other these extrapolations determine the common limiting point with greater accuracy.

Another feature of the type of curve such as Fig. 3 given by the invention is that it retains peak height information, hence retains the same useful qualitative information as in the conventional chromatogram, i.e. number of peaks present, their sequence and their degree of resolution.

Figure 4:
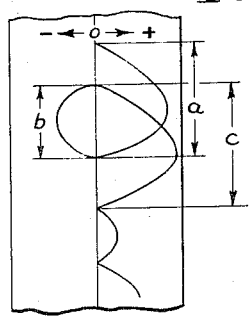
Fig. 4 shows a chart similar to that of Fig. 3 with both positive and negative output signals recorded.

When the output signal from the signal source assumes both positive and negative values, a curve such as that shown in Fig. 4 will be produced, wherein the direction of chart travel is reversed when the pen indicates negative values. The distance $a$ represents the area under the first positive peak, the distance $b$ represents the area under the first negative peak, and the distance $c$ represents the area under the second positive peak.

In gas chromatography consecutive peaks are typically longer-lasting as the analytical run progresses. Thus, there may be a considerable range, 20 to 1 or more, in the time of duration of individual signal peaks. In order to avoid wasteful run-off of chart paper when peaks are both long lasting and of appreciable peak height on the chart, the attenuator 11a may be adjusted to reduce the rate of chart movement per unit of lateral pen motion. Expressed differently, this is a means of changing the proportionality constant $k$ in the mentioned equation $x=k\int edt$. For gas chromatography, attenuation ratios of 1:5:20 have been found satisfactory. The attenuator adjustment is ordinarily carried out in zero signal value intervals between signal peaks.

Another chart paper saving feature shown in Fig. 1 comes into play if the operator neglects to adjust attenuator 11 to reduce those peaks which otherwise would greatly exceed the upper scale limit. This comprises a limit switch circuit which deactivates the servoamplifier, for example by shorting its input, when the maximum pen deflection is reached. Referring to Fig. 1, a switch 46 is engaged by the arm 21 of the potentiometer 20 when the pen 17 reaches the limit of its travel. This switch 46 is connected to short the input of the servoamplifier 31 to stop movement of the chart 13. Of course, no valid information is plotted during the off-scale interval of the signal. Such a plot is shown on the chart 13 where the curve 47 reached the maximum value and the motion of the chart stopped at the point indicated by the dotted line 48, with chart motion starting again when the magnitude of the curve 47 dropped below the limit.

Figure 5:
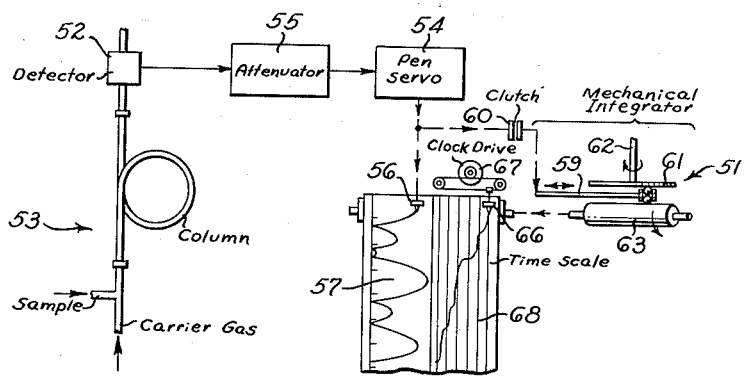
Fig. 5 is a diagrammatic representation of an alternative embodiment of the invention suitable for use with any independent variable.

In Fig. 5, an alternative embodiment of the invention is shown with a mechanical integrator 51 substituted for the rate servo 12 of the apparatus of Fig. 1. The signal source is exemplified here as comprising a detector 52 of a gas chromatograph 53 with the output signal from the detector coupled to a pen servo 54 through an attenuator 55. The pen servo drives a marking pen 56 to produce a curve on a chart 57 in the same manner as in the apparatus of Fig. 1.

The mechanical integrator 51 may be a conventional ball-and-disc integrator with the ball arm 59 driven in translation by the pen servo through a clutch 60. A disc 61 is driven by a shaft 62, the shaft's angular position being directly proportional to the independent variable. Output shaft 63 of the integrator, usually through suitable gearing, drives the chart 57. Hence the displacement of the chart is proportional to the integral of the signal from the detector 52. When, as with the gas chromatograph here illustrated, the integration is to be made with respect to time, the shaft 62 will be driven by a constant speed motor or the like. Preferably the motor will be variable in speed, for example in ratios of approximately 1:5:20 to vary the integration proportionality factor, for purposes analogous to those explained for attenuator 11a of Fig. 1.

Of course, the shaft 62 may be rotated in proportion to any desired independent variable other than time. For example, where it is desired to determine the total energy expended in rupturing a specimen in a tensile strength test, the shaft 62 would be rotated in direct proportion to the tensile elongation and the arm 59 would be made to assume a position always directly proportional to the instantaneous force. The total length of the curve, i.e., the abscissa, between start of the test and rupture would be the integrated energy with the ordinate representing the instantaneous applied force.

When it is desired to record the output signal from the detector as a function of time, the clutch 60 is disengaged and the arm 59 is fixed in a stationary position. With the shaft 62 driven at a constant speed, a recording such as that of Fig. 2 will then be produced.

In the characteristic recording of the invention such as Fig. 3, full information on elapsed time is lacking. For example, where the signal level between peaks is typically zero as is the case with the output of gas chromatographs, the chart will remain stationary regardless of the elapsed time between peaks. It is sometimes desirable to know the actual elapsed time at which particular peaks appear in a record, such as for purposes of identification in gas chromatograph outputs. One method of providing time information is incorporated in the apparatus of Fig. 5.

The left portion of the chart 57 of Fig. 5 is used in producing the record of the output signal and its integral with respect to the independent variable. In the right position, a pen 66 is driven by a clock 67 at a uniform rate transversely across the chart 57 with the parallel longitudinal lines 68 representing equal time intervals. The pen 66 coincides in longitudinal chart position with the signal recording pen 56 so that a perpendicular to the base line will intersect both records at the same point in time.

In an alternative arrangement, not shown, which may be more suitable for long-lasting runs with high time accuracy, the time-pen 66 may be made to reverse its direction of motion when it reaches either end of its travel. Time would then be estimated by counting the reversal points and interpolating therebetween.

In another alternative time recording arrangement the time recording pen may traverse the full width of the chart, or at least overlap a portion of the lateral range covered by the integral recording pen. In this case the time recording pen position is longitudinally displaced along the chart by a known, fixed distance with respect to the integrating pen so that the two pens will not interfere with each other. The known displacement is taken into account by the operator when he interprets the chart for time information.

Figure 6:
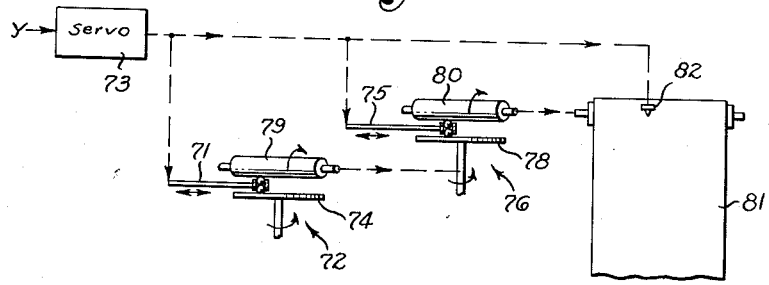
Fig. 6 is a diagrammatic representation of another alternative embodiment of the invention.

Fig. 6 shows an alternative embodiment of the invention wherein a form of double integration applied to an output signal gives a quantity appearing as a linear dimension on the chart. In effect this apparatus determines the areas under the peaks of a diagram of the type of Fig. 3. An arm 71 of a ball-and-disc integrator 72 is translated by a servo 73 which is driven by the output signal $y$. The angular position of disc 74 is varied in direct proportion to the independent variable. Arm 75 of a ball-and-disc integrator 76 is also driven by the servo 73 as a function of output signal $y$. Disc 78 of the integrator 76 is driven by output cylinder 79 of the integrator 72 and output cylinder 80 of the integrator 76 drives a chart 81. The servo 73 also drives a pen 82 for marking on the chart. If the signal $y$ is a function of $w$, the travel of the chart 81 i.e., the abscissa of the recorded curve, will be equal to $k\int y^2 dw$ and the ordinate value will be directly proportional to the signal $y$.

Figure 7:
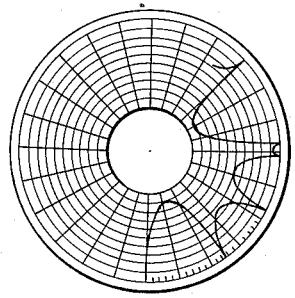
Fig. 7 illustrates the use of the invention with a circular chart.

The method and apparatus of the invention are not limited to rectangular co-ordinate charts nor to charts moving in translation. For example, the shaft 30 of Fig. 1 may be used to drive a circular chart such as that shown in Fig. 7 with the pen 17 being moved radially. With circular charts, it is preferred to have the base line or zero ordinate value at the periphery of the chart, thereby providing maximum length of base line for maximum precision of measurement. The chart of Fig. 7 is interpreted in the same manner as the chart of Fig. 3.

Thus, with the method and apparatus of the invention, an arbitrarily varying quantity and its integral with respect to an independent variable can be simultaneously recorded by relatively driving a chart writing element and a chart in a first direction by an amount directly indicating the varying quantity and simultaneously relatively driving the writing element and chart in a second direction by an amount continuously proportional to the integral of the arbitrarily varying quantity with respect to the independent variable, which integral is being continuously derived.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In an apparatus for recording as a lineal quantity the integral with respect to an independent variable of an input signal which has peak values alternating with the occurrence of minimum values, the combination of: a chart having a linear axis; a marking element for marking on said chart; means for continuously deriving the integral of said input signal with respect to said independent variable; means for relatively displacing said chart and said marking element in the direction of said axis as a function of said integral; and means for actuating said marking element in response to the magnitude of said input signal for marking said chart and indicating thereon the positions of occurrence of said minimum values, with the lineal distance on said axis between minimum markings being a measure of the integral of the signal for the period between the minimum values thereof.

2. In an apparatus for simultaneously recording, as a single trace, an arbitrarily varying signal and the integral of said signal with respect to an independent variable, the combination of: chart means having a base line; a chart writing element; means responsive to said signal for relatively displacing said writing element and chart means along a first coordinate direction toward and away from said base line as a function of said signal with said chart writing element intersecting said base line for a minimum value of said signal; means for continuously deriving the integral of said signal with respect to said independent variable; and means for simultaneously relatively displacing said writing element and chart means along a second co-ordinate direction corresponding to said base line in proportion to said integral with the distance between successive intersections of said base line by said chart writing element corresponding to the integral of said signal for the interval between said minima.

3. An apparatus as defined in claim 2 in which said chart means is a circular chart having a base line near the periphery thereof, with said chart writing element being displaced from said base line toward the center of said chart, and in which said means for simultaneously relatively displacing said writing element and chart means along a second co-ordinate direction rotates said chart with respect to said writing element in proportion to said integral.

4. An apparatus as defined in claim 2 in which said means for continuously deriving the integral of said signal with respect to said independent variable includes: a ball and disc integrator; means for varying the integrator ball position in proportion to the magnitude of said signal; and means for varying the angular position of the integrator disc in proportion to the magnitude of said independent variable, with the integrator output shaft coupled to said means for simultaneously relatively displacing said writing element and chart means along a second co-ordinate direction.

5. In an apparatus for simultaneously recording, as a single trace, an arbitrarily varying signal and the integral of said signal with respect to an independent variable, the combination of: chart means having a base line; a first chart writing element; a second chart writing element; means responsive to said signal for relatively displacing said first writing element and chart means along a first co-ordinate direction toward and away from said base line as a function of said signal with said first chart writing element intersecting said base line for a minimum value of said signal; means for continuously deriving the integral of said signal with respect to said independent variable; means for simultaneously relatively displacing said first writing element and chart means along a second coordinate direction corresponding to said base line in proportion to said integral with the distance between successive intersections of said base line by said first chart writing element corresponding to the integral of said signal for the interval between said minima; and means for relatively displacing said second writing element and chart means along said first co-ordinate direction by an amount continuously proportional to said independent variable.

6. In an apparatus for simultaneously recording, as a single trace, an arbitrarily varying signal and the integral of said signal with respect to time, the combination of: chart means having a base line; a first chart writing element; a second chart writing element; means responsive to said signal for relatively displacing said first writing element and chart means along a first co-ordinate direction toward and away from said base line as a function of said signal with said first chart writing element intersecting said base line for a minimum value of said signal; means for continuously deriving the integral of said signal with respect to time; means for simultaneously relatively displacing said first writing element and chart means along a second co-ordinate direction corresponding to said base line in proportion to said integral with the distance between successive intersections of said base line by said first chart writing element corresponding to the integral of said signal for the interval between said minima; and means for relatively displacing said second writing element and chart means along said first co-ordinate direction as a function of time.

7. In an apparatus for recording the integral of a variable electrical signal with respect to time, the combination of: a servoamplifier; a servomotor driven by said servoamplifier; signal generating means driven by said servomotor for generating a feedback signal substantially proportional to the motor speed; means for applying said variable electrical signal and said feedback signal in opposing relationship as the input to said servoamplifier; recording means comprising a chart and a chart writing element; means for relatively displacing said chart and writing element along a first co-ordinate direction a distance directly indicative of the magnitude of said variable electrical signal; and means coupling said servomotor to said recording means in driving relationship for relatively displacing said chart and writing element along a second co-ordinate direction.

8. In an apparatus for simultaneously recording, as a single trace, an arbitrarily varying signal and the integral of said signal with respect to an independent variable, the combination of: chart means having a base line; a chart writing element; first actuating means responsive to said signal for relatively displacing said writing element and chart means along a first co-ordinate direction toward and away from said base line as a function of said signal with said chart writing element intersecting said base line for a minimum value of said signal; means for continuously deriving the integral of said signal with respect to said independent variable; second actuating means adapted to simultaneously relatively displace said writing element and chart means along a second co-ordinate direction corresponding to said base line in proportion to said integral with the distance between successive intersections of said base line by said chart writing element corresponding to the integral of said signal for the interval between said minima; third actuating means adapted to simultaneously relatively displace said writing element and chart means along said second co-ordinate direction in proportion to said independent variable; and control means for selectively coupling one of said second and third actuating means to said writing element and chart means in driving relationship.

9. In an apparatus for use with a gas chromatograph which produces an electrical output signal having time intervals of substantially zero signal value between signal peaks identifiable with sample components, the combination of: recording means comprising a chart and a writing element; means for relatively displacing said chart and writing element along a first co-ordinate direction as a function of said signal; attenuating means for attenuating said signal to maintain the peak value thereof below a predetermined level, said attenuating means being variable during said zero signal value intervals; means for continuously deriving the integral of said signal with respect to time; and means for relatively displacing said chart and writing element along a second co-ordinate direction in proportion to said integral.

10. In an apparatus for simultaneously recording a quantity and the integral of the quantity with respect to an independent variable, the combination of: chart means; a chart writing element; means for relatively displacing said chart means and writing element along a first co-ordinate direction as a function of said quantity; means for continuously deriving the integral of said quantity with respect to said independent variable; means for relatively displacing said chart means and writing element along a second co-ordinate direction in proportion to said integral; and means for arresting said displacement along said second co-ordinate direction during intervals when said quantity exceeds a predetermined value.

11. In an apparatus for recording as a lineal quantity the integral with respect to an independent variable of an input signal which has peak values between substantially zero value points, the combination of: a chart having a base line; a marking element for recording a curve on said chart, which curve can meet said base line; means for driving said chart in the direction of said base line as a function of the integral of said input signal with respect to the independent variable; and means for driving said marking element as a function of said input signal to mark a curve on said chart with the meeting of the curve with said base line indicating a zero value point of said signal and with the lineal distance along said base line between zero value points being a measure of the integral of said signal for the period between the zero value points thereof.

12. In a recorder for modifying the output signal of a gas chromatograph to provide a single trace record of the magnitude of peaks of said signal and of the area under said peaks, the combination of: a chart having a base line; a chart writing element; a variable attenuator; an integrating unit; means for coupling said output signal through said attenuator to said chart writing element in driving relationship, whereby said writing element is displaced relative to said base line as a function of the magnitude of said output signal; and means for coupling said output signal through said attenuator and said integrating unit to said chart in driving relationship, whereby said chart is moved in the direction of said base line as a function of the integral of said output signal with the magnitude of chart movement as measured by minimal displacements of said chart writing element preceding and following a peak corresponding to the area under such peak, and with said attenuator being variable during periods of minimum output signal for attenuating said output signal for successive peaks by different known amounts.

13. In an apparatus for use with a gas chromatograph which produces an electrical output signal having time intervals of substantially zero signal value between signal peaks identifiable with sample components, the combination of: functional amplifier means for functionally modifying said signal; recording means comprising a chart and a writing element; means for relatively displacing said chart and writing element along a first coordinate direction in proportion to said modified signal; integrating means for continuously deriving the integral of said signal; means for relatively displacing said chart and writing element along a second coordinate direction in proportion to said integral; and attenuating means coupled between said output signal and said integrating means for reducing said relative displacement along said second coordinate direction, said attenuating means being variable during said zero value intervals.

References Cited in the file of this patent

UNITED STATES PATENTS

| | | |
|---|---|---|
| 1,208,512 | Dempster | Dec. 12, 1916 |
| 2,886,759 | Umrath | May 12, 1959 |
| 2,904,384 | Norem | Sept. 15, 1959 |